Apr. 3, 1923.
A. W. SCHEDE ET AL
1,450,905
WHEEL ATTACHMENT
Filed May 11, 1922
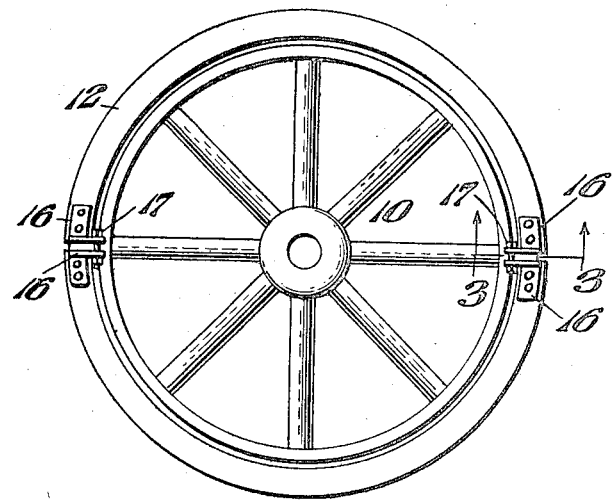
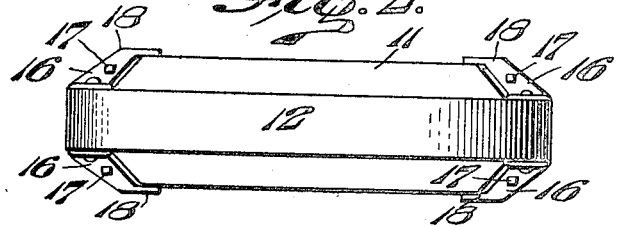
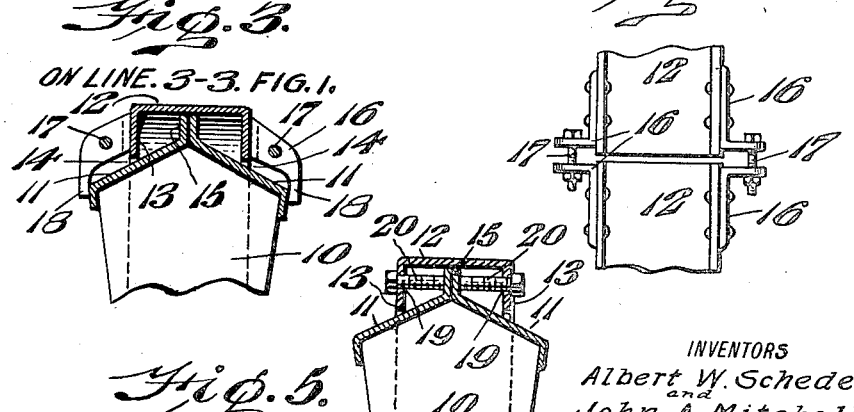
INVENTORS
Albert W. Schede
and
John A. Mitchell.
Robert M. Bass
ATTORNEY Patented Apr. 3, 1923.

1,450,905

UNITED STATES PATENT OFFICE.

ALBERT W. SCHEDE, OF DREXEL HILL, AND JOHN A. MITCHELL, OF RIDLEY PARK, PENNSYLVANIA.

WHEEL ATTACHMENT.

Original application filed November 10, 1921, Serial No. 514,144. Divided and this application filed May 11, 1922. Serial No. 560,096.

*To all whom it may concern:*

Be it known that we, ALBERT W. SCHEDE and JOHN A. MITCHELL, citizens of the United States, and residents, respectively, of Drexel Hill, county of Delaware, State of Pennsylvania, and Ridley Park, county of Delaware, State of Pennsylvania, have invented certain new and useful Improvements in Wheel Attachments, of which the following specification forms a division of application Serial No. 514,144, filed November 10, 1921.

Some of the objects of the present invention are to provide an improved removable wheel tread having a smooth, unobstructed road contacting surface whereby the traction producing projections, or other road gripping devices of tractor wheels are rendered ineffective when driven over roads or highways having the customary finished smooth surface; to provide means for insuring the protection of highways from damage when traversed by rough-surfaced treads of field tractors or other heavy vehicles ordinarily not intended for highway travel; to provide an attachment for tractor wheels for the purpose of transforming the tread thereof into one having a smooth, circumferential, road-engaging surface, and wherein the attachment is so arranged and constructed as to distribute the load uniformly so that buckling or crushing of the attachment cannot take place; to provide means for preventing lateral movement of the attached tread relative to the wheel proper; and to provide other improvements as will hereinafter appear.

In the accompanying drawings Fig. 1 represents a side elevation of a wheel of a tractor equipped with a protective tread embodying one form of the present invention; Fig. 2 represents a plan of the same; Fig. 3 represents a section on line 3—3 of Fig. 1; and Fig. 4 represents a detail in elevation of one form of the tread fastening means.

Referring to the drawings, one form of the present invention is shown as applied to a wheel 10, having a substantially V-shaped or fin-like tire 11, such for example as are now generally employed for the front wheels of farm tractors or agricultural machines. This type of tire is particularly efficient for running over fields, plowed land, or any other rough ground, and while useful to that end is quite destructive if caused to travel a State road or any other finished highway.

For the purpose of rendering such a wheel applicable for use on roads and highways without damage to the surface thereof, one form of the present invention consists in the provision of a removable tread 12, preferably in the form of a segmental ring, the face of which is of less width than the wheel rim and has inwardly turned side flanges 13, the depth of which is substantially equal to the radial distance from the line of contact 14, on the wheel rim 11, to the peripheral plane including the tread edge of the V or fin 15 of the wheel 10. Thus the tread ring 12 is generally of channel shape, of accurate diameter to encircle the wheel rim 11 and, when so positioned and assembled, has three circumferential lines of contact with the rim 11, namely the medial contact 15 and the contacts 14 on opposite sides thereof. This construction provides a smooth, broad tread surface with the weight evenly distributed and transferred to the wheel proper through the aforesaid contact bearings, thereby relieving the attached tread 12 of shearing and bending stresses.

In order to secure the tread 12 to the wheel rim 11, one means comprises lugs 16 of angle iron bolted to the respective ends of the tread segments by bolts 17, which traverse the juxtaposed pairs of lugs 16. In this connection it will be noted that the tread segments, of which there are preferably two, have sufficient clearance between the meeting ends to allow for expansion as well as the necessary clamping action to retain the segments in operative position upon the wheel.

As a means to prevent any lateral creeping or displacement of the tread 12, when clamped to the wheel 10, the lugs 16 are each provided with an extension 18 arranged so as to overlap the outer edge of the wheel rim 11, so that in assembled condition the opposed sets of the said extensions 18 coact with the rim 11 at opposite edges to maintain the tread 12 accurately centered at all times.

Another means for preventing lateral displacement or creeping consists in providing tapped holes 19 in the respective flanges 13 at suitable locations so that stud bolts 20 can be passed through the respective holes 19 and rigidly set against a side of the rim fin 15. Preferably two holes 19, one in each flange, are coaxially arranged, so that two opposed stud bolts 20 are in aligned relation as shown in Fig. 5. This stud bolt construction may be employed in conjunction with the construction shown in Fig. 1 by locating the tapped holes 19 and studs 20 at suitable circumferentially spaced points between the extensions 18 and thus maintain the tread 12 rigidly held with respect to the wheel rim 11.

In assembling the attachment one segment of each ring is placed in proper position in front of the wheel to which it is to be applied, and the vehicle is then moved so that the wheels seat respectively in the ring segments. The other rim segments are then placed on the wheels and rigidly bolted to the first segments by the aforesaid bolts 17, while the extensions 18 take a position abutting the edges of the wheel 10. Also if the stud bolt construction is employed, the said bolts 20 are set against the sides of the fin, thereby firmly holding the tread against creeping. The result is a complete rigid wheel and tread, the latter being fixed against lateral movement and its flanges 13 seating upon the wheel rim proper to resist bending and buckling.

From the foregoing it will be evident that a unitary tread covering is provided for wheels having a fin, projections, or other traction devices injurious to roadbeds, whereby such wheels become harmless and can be operated without violating the highway laws for road protection. Furthermore the entire circumferential length of the attached tread is directly supported by the wheel rim so that it is not subject to crushing, bending, or flattening under the moving load. Thus the load is carried through the attachment to the wheel on three circumferential lines of contact which distribute the load and give a solid resistance to buckling strains.

By the present invention it becomes unnecessary to purchase or keep on hand a second or auxiliary set of smooth tread tractor wheels to be substituted whenever the machine is to be run over improved highways, nor is it necessary to jack up the tractor wheels to apply the protective tread members.

Furthermore it is unnecessary to prepare the standard tractor wheels in any particular to receive the superposed tread surfaces of the present invention, because they can be placed in position and assembled in clamped condition for operating purposes without slotting, drilling, cutting or otherwise altering the usual tractor wheel.

While but one form of the present invention has been here shown, it is to be understood that the invention is not limited to its application to any specific construction but might be applied in various ways without departing from the spirit of the invention or the scope of the appended claims.

Having thus described our invention, we claim:

1. In combination, a tractor wheel having a substantially V-shaped radially projecting tread surface, a removable channel shaped ring arranged to encircle said surface and having a plurality of continuous circumferential lines of contact with said surface, said ring providing a tread surface all points of which are equidistant from the axis of said wheel, and means to clamp said ring to said wheel.

2. In combination, a tractor wheel having a circumferential fin radially projecting from the tread surface thereof, a removable ring arranged to seat circumferentially upon said fin, flanges on said ring arranged to seat circumferentially upon said tread surface, said ring thereby having a plurality of circumferential lines of bearing contact upon said wheel, and means including side extensions for clamping said ring to said wheel and preventing lateral displacement thereof.

Signed at Philadelphia, in the county of Philadelphia, and State of Pennsylvania, this 28 day of April, 1922.

ALBERT W. SCHEDE.
JOHN A. MITCHELL.